US011269772B2

(12) United States Patent
Shu et al.

(10) Patent No.: US 11,269,772 B2
(45) Date of Patent: Mar. 8, 2022

(54) PERSISTENT MEMORY STORAGE ENGINE DEVICE BASED ON LOG STRUCTURE AND CONTROL METHOD THEREOF

(71) Applicant: Tsinghua University, Beijing (CN)

(72) Inventors: Jiwu Shu, Beijing (CN); Youmin Chen, Beijing (CN); Bohong Zhu, Beijing (CN); Youyou Lu, Beijing (CN)

(73) Assignee: Tsinghua University, Beijing (CN)

( * ) Notice: Subject to any disclaimer, the term of this patent is extended or adjusted under 35 U.S.C. 154(b) by 275 days.

(21) Appl. No.: 16/553,253

(22) Filed: Aug. 28, 2019

(65) Prior Publication Data
US 2021/0019257 A1    Jan. 21, 2021

(30) Foreign Application Priority Data
Jul. 19, 2019 (CN) .......................... 201910656133.7

(51) Int. Cl.
G06F 12/06     (2006.01)
G06F 16/21     (2019.01)
G06F 16/22     (2019.01)

(52) U.S. Cl.
CPC ........ *G06F 12/0646* (2013.01); *G06F 16/219* (2019.01); *G06F 16/2246* (2019.01); *G06F 16/2255* (2019.01); *G06F 2212/1008* (2013.01)

(58) Field of Classification Search
CPC ............... G06F 12/0646; G06F 16/219; G06F 16/2246; G06F 16/2255; G06F 2212/1008
See application file for complete search history.

(56) References Cited

U.S. PATENT DOCUMENTS 7,246,187 B1 * 7/2007 Ezra ...................... G06F 9/526
                                                  710/200
8,612,402 B1 * 12/2013 Givargis ............... G06F 16/217
                                                  707/693
(Continued)

FOREIGN PATENT DOCUMENTS

CN     108874592 A     11/2018
CN     108763508 B      7/2019

OTHER PUBLICATIONS

Juan; "A Persistent Transaction Memory System Based on Microlog;" School of Information Science and Engineering, Southeast University; Dec. 31, 2018; available at: https://crad.ict.ac.cn/EN/10.7544/issn1000-1239.2018.20180294 (Year: 2018).*

(Continued)

*Primary Examiner* — Ryan Bertram
*Assistant Examiner* — Richard L Sutton

(57) ABSTRACT

The present invention provides persistent memory storage engine device based on log structure and a control method, including persistent memory allocators, persistent operation logs, and a volatile index structure. The control method of log structure-based storage engine includes: allocating by persistent memory allocators, new spaces to each processor for storing updated key value pairs; organizing acquired operation information into compact log entries, and adding compact log entries into persistent operation logs according to first preset rule, where first preset rule is performing batch persistency on compact log entries from the plurality of processor cores; and updating index entries in volatile index structure to point to new key value pairs. This application fully exploits opportunity to reduce persistence overhead by redesigning log structure storage format and batch persistence mode. An efficient persistent memory key-value stor- (Continued)

age engine based on log structure is designed which reduces latency while maintaining high system throughput.

10 Claims, 3 Drawing Sheets

(56) References Cited

U.S. PATENT DOCUMENTS

| | | | |
|---|---|---|---|
| 9,569,255 B1* | 2/2017 | Johnson | G06F 9/4806 |
| 2004/0054643 A1* | 3/2004 | Vemuri | G06F 16/2358 |
| 2007/0083687 A1* | 4/2007 | Rinaldi | G06F 9/524 |
| | | | 710/200 |
| 2012/0249098 A1* | 10/2012 | Popescu | G01R 19/0023 |
| | | | 323/265 |
| 2015/0207855 A1* | 7/2015 | Hanckel | H04L 67/1097 |
| | | | 709/201 |
| 2016/0246830 A1* | 8/2016 | Chiu | G06F 16/1734 |
| 2017/0024315 A1* | 1/2017 | Leshinsky | G06F 12/0253 |
| 2017/0300592 A1* | 10/2017 | Breslow | G06F 16/9014 |

OTHER PUBLICATIONS

Stoif, Christian; "Hardware Synchronization for Embedded Multi-Core Processors;" DTU library; 2011; available at: https://backend.orbit.dtu.dk/ws/portalfiles/portal/6285865/SynMCPs.pdf (Year: 2011).*

* cited by examiner

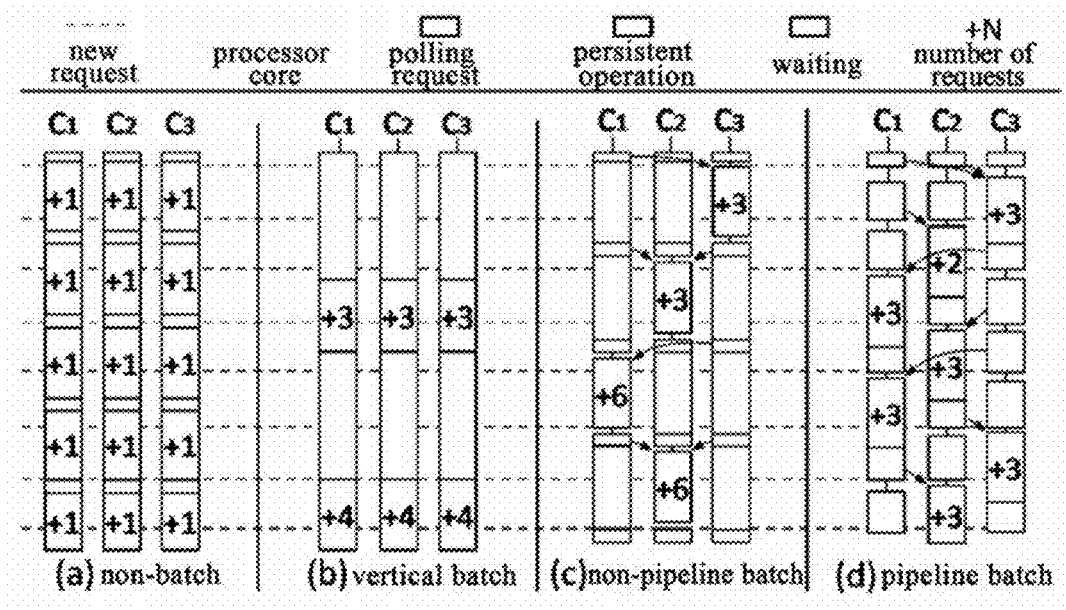

Fig.4

Initializing, by each of the processor cores, the compact log entries, and after completing initialization, racing, by all of the processor cores, a global lock — S2100

If one of the processor cores succeeds in racing, combining the compact log entries that have been initialized by other processor cores into a large log entry — S2200 persisting the large log entry into a local operation log, releasing the global lock, and notifying other processor cores information about completion of persistency — S2300

Fig.5

PERSISTENT MEMORY STORAGE ENGINE DEVICE BASED ON LOG STRUCTURE AND CONTROL METHOD THEREOF

CROSS-REFERENCE TO RELATED APPLICATIONS

This application claims the benefit of priority from Chinese Patent Application No. CN201910656133.7, filed on Jul. 19, 2019. The content of the aforementioned application, including any intervening amendments thereto, is incorporated herein by reference in its entirety.

TECHNICAL FIELD

The present invention relates to the field of persistent memory storage technologies, and in particular, to a persistent memory storage engine device based on log structure and a control method.

BACKGROUND OF THE PRESENT INVENTION

Persistent Memory (PM) is a new type of memory-level storage device with byte-addressability, such as phase change memory (PCM), spin-torque transfer RAM (STT-RAM), Resistive RAM (RRAM) and the latest Intel Optane DC persistent memory. Persistent memory features in low read and write latency, high bandwidth, data persistence, and low power consumption. Persistence memory not only has similar read and write performance as DRAM, but also provides persistence similar to external storage such as traditional disk. In view of high-performance storage devices and the growing RDMA high-speed networking technology, it is important to build an efficient key-value storage engine with low-latency and high-throughput.

For a long time, CPU utilization has been limited by two factors. First, maintaining an index structure in persistent memory introduces huge CPU overhead. For a hash-based index structure, it is needed to rehash multiple key-value entries again when multiple keys conflict, or when the entire hash index is resized; for the tree-based index structure, it is needed to keep moving respective key-value entries in each tree node to ensure the order of the key-value entries, and to merge and split the tree nodes to ensure the balance of the tree. In order to ensure crash consistency, the foregoing operations will result in frequent cache line eviction instructions, which will introduce huge time overhead. Second, for multi-core platforms, it is difficult to achieve both low latency and high throughput. Using RDMA high-speed network devices and user-mode polling techniques can reduce latency but affect overall bandwidth due to large CPU time for polling; using batch processing can provide high bandwidth but inevitably introduces high latency.

Some existing designs propose to build a key value storage engine of persistent memory by using a log structure. The storage in the log structure simplifies the update of persistent memory, and requests of multiple clients are processed in a batch to amortize the overhead of the persistence operation. However, these designs adopt the log structure only for the purpose of achieving crash consistency or reducing persistent memory fragmentations, without the opportunity to make full use of batch processing multiple requests to reduce the overhead of persistence operations.

The design of building a key value storage engine for persistent memory by simply using log structure makes low latency and high bandwidth conflicting with each other and difficult to be achieved at the same time. It is difficult to achieve both low latency and high bandwidth without changing the traditional way of using the log structure and the way to batch process multiple requests.

SUMMARY OF THE PRESENT INVENTION

The purpose of the present invention is to fully exploit the opportunity of reducing overhead for persistence by redesigning the log structure storage format and the batch persistence mode, and to design an efficient log-structured persistent memory key value storage engine which reduces latency while ensuring high system throughput.

In order to achieve the above objective, an embodiment of the first aspect of the invention discloses a persistent memory storage engine device based on log structure, including:

persistent memory allocators: configured for managing persistent memory spaces of respective processor cores, and further allocating new spaces to each of the processors for storing updated key-value pairs;

persistent operation logs: configured for organizing acquired operation information into compact log entries to be added into storage according to a first preset rule, wherein the first preset rule is to perform batch persistency on the compact log entries from a plurality of processor cores; where there are a plurality of persistent operation logs and persistent memory allocators, with each of the processor cores being provided with the persistent operation log and the persistent memory allocator; and a volatile index structure: configured for updating index entries to point to new key-value pairs.

Preferably, the present application is provided with a global lock to synchronize the plurality of processor cores to concurrently add the persistent operation logs.

Preferably, in the process of performing batch persistency on the compact log entries from the plurality of processor cores, all cores on a same processor are grouped together to reduce overhead in racing for a global lock without affecting batch processing opportunity.

Preferably, the persistent memory allocator divides the persistent memory space into memory regions of a same size and formats the memory regions into memory blocks of different levels; the memory blocks in a same memory region are of a same size; and a prelude of each memory region is used to store bitmap metadata describing current allocation status.

In another aspect, the present application further discloses a control method of a persistent memory storage engine based on log structure, on a basis of the storage engine device based on log structure according to any one the above embodiments, where the control method includes:

allocating, by the persistent memory allocators, the new spaces to each of processors for storing the updated key value pairs;

organizing the acquired operation information into compact log entries, and adding the compact log entries into the persistent operation logs according to the first preset rule, where the first preset rule is to perform batch persistency on the compact log entries from the plurality of processor cores; and updating index entries in the volatile index structure to point to the new key value pairs.

Preferably, organizing the acquired operation information into compact log entries and adding the compact log entries into the persistent operation logs according to the first preset rule includes:

initializing, by each of the processor cores, the compact log entries, and after completing initialization, racing, by all of the processor cores, a global lock;

if one of the processor cores succeeds in racing, combining the compact log entries that have been initialized by other processor cores into a large log entry; and persistently recording the large log entry into a local operation log, releasing the global lock, and notifying other processor cores information about completion of persistency.

Preferably, performing batch persistency on the compact log entries from the plurality of processor cores includes:

when a certain processor core fails in racing for the global lock, acquiring a new client request and performing a new round of batch persistence operation.

Preferably, allocating, by the persistent memory allocators, the new spaces to each of processors for storing the updated key value pairs includes:

after the persistent memory allocators allocate the new spaces, writing the new key-value pairs to the new spaces, and reclaiming the persistent memory spaces for storing old version of the key-value pairs.

Preferably, when a size of the key value pair is smaller than one cache line, the key value pair is directly stored in an end of the compact log entry.

Preferably, respective processor cores periodically clean up historical log entries in the persistent operation logs when the persistent memory key value storage engine continues to work.

Preferably, the control method further includes:

in a case of normal shutdown, copying, by the storage engine based on log structure, the volatile index structure into a persistent memory and persistently recording bitmap metadata in each of the memory regions;

after a reboot, importing the volatile index from the persistent memory; and in a case of system failure, reconstructing the volatile index by scanning the log entries.

The additional aspects and advantages of the invention will be set forth in part in the following description, will be apparent in part from the following description, or will be understood in practicing the present invention.

BRIEF DESCRIPTION OF THE DRAWINGS

The above and/or additional aspects and advantages of the present invention will become apparent and readily understood from the following description of the embodiments in connection with the drawings, in which:

FIG. 4 is a schematic comparison diagram of different persistence technologies in the present invention;

FIG. 5 is a flowchart of a method for adding compact log entries to a persistent operation log according to the present invention;

DETAILED DESCRIPTION OF THE PRESENT INVENTION

Figure 1:
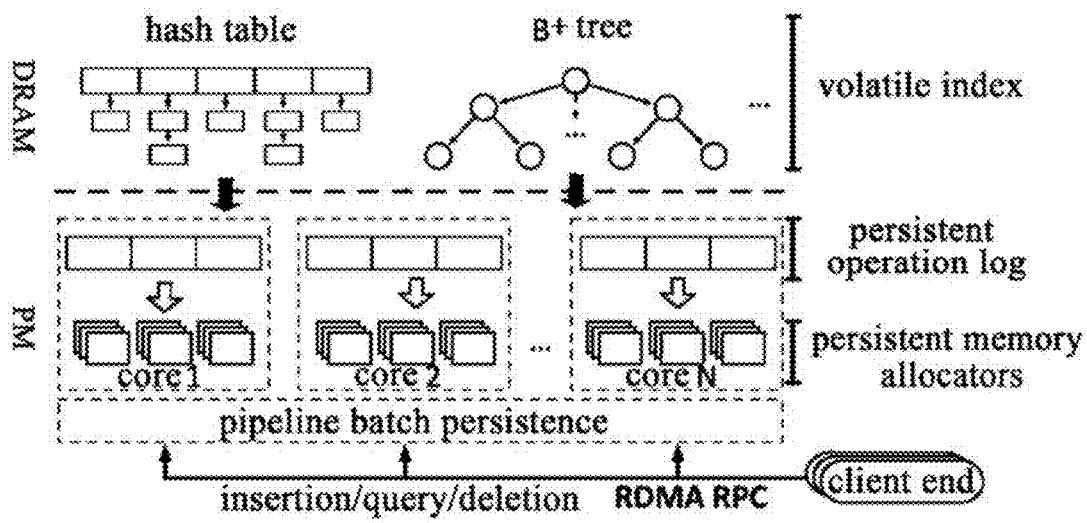
FIG. 1 is a schematic structural diagram of a control method of a persistent memory storage engine based on log structure according to the present invention.

The embodiments of the present invention are described in detail below, and the examples of the embodiments are illustrated in the drawings, where same or similar reference numerals are used to refer to same or similar elements or elements having same or similar functions. The embodiments described below with reference to the drawings are intended to be illustrative of the invention and are not to be construed as limiting.

In the description of the present invention, it is to be understood that the orientation or positional relationship indicated by the terms "center", "longitudinal", "lateral", "upper", "lower", "front", "back", "left", "right", "upright", "horizontal", "top", "bottom", "inside", "outside", etc., is based on the orientation or positional relationship shown in the drawings, and is only for the convenience of describing the present invention and simplification of the description; it is not intended to indicate or imply the necessity for the referred devices or elements to have a particular orientation, be constructed in a particular orientation and operate in a particular orientation; and thus it is not to be construed as limiting to the present invention. Moreover, the terms "first" and "second" are used for descriptive purpose only and are not to be construed as indicating or implying relative importance.

In the description of the present invention, it should be noted that, unless otherwise expressly stated and limited, the terms "installing", "connecting", and "connection" are to be understood broadly as, for example, fixed connection, detachable connection, or integral connection; mechanical connection or electrical connection; direct connection, or indirect connection via intermediate medium; internal communication between two elements. The specific meaning of the above terms in the present invention can be understood by those skilled in the art according to specific cases.

The design of persistent memory key value storage engine based on log structure according to an embodiment of the present invention will be described below with reference to the drawings.

Persistent memory is a new type of storage device with byte-addressability similar to DRAM while providing data persistence. The persistent memory key value storage engine is used to manage data stored as key-value pairs in a persistent memory, and is applicable to any existing index structure. FIG. 1 shows a schematic structural diagram of an embodiment of the present invention. A log-structured persistent memory storage engine device disclosed in the present application includes a storage engine having a volatile index structure, persistent operation logs, and persistent memory allocators; where the persistent memory allocator is adapted for managing persistent memory spaces of respective processor cores, and further allocating new spaces to each of the processors for storing updated key-value pairs; the persistent operation log is adapted for organizing acquired operation information into a compact log entry to be added into storage according to a first preset rule, where the first preset rule is to perform batch persistency on the compact log entries from multiple processor cores; there are multiple persistent operation logs and persistent memory allocators, with each of the processor cores being provided with the persistent operation log and the persistent memory allocator; the volatile index structure is adapted for updating index entries to point to new key-value pairs.

Figure 2:
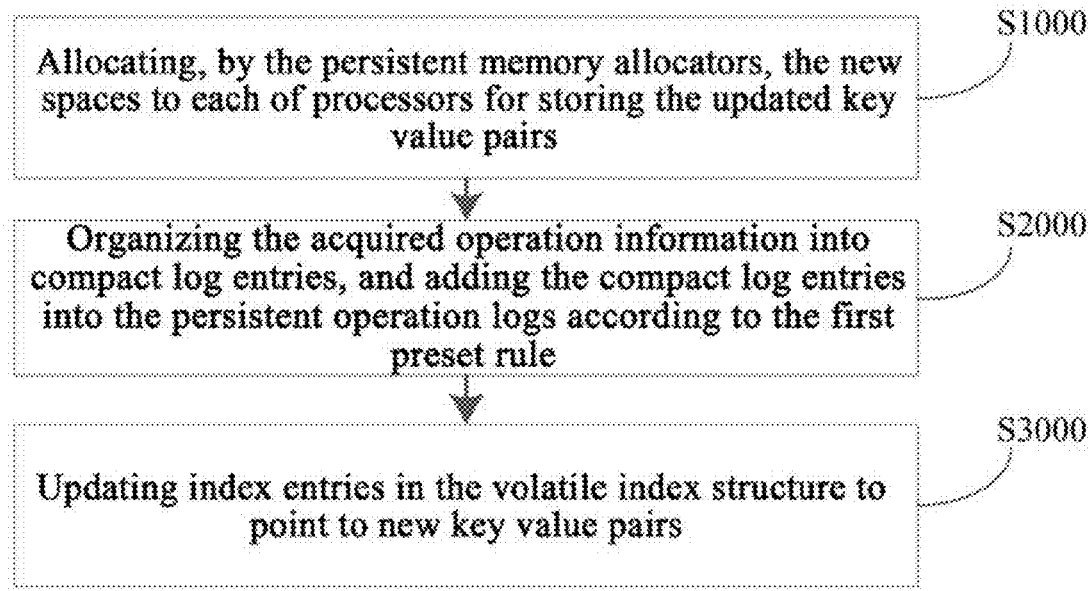
FIG. 2 is a flowchart of a control method of a persistent memory storage engine based on log structure according to the present invention.

Referring to FIG. 2, on the basis of the log structure-based storage engine device according to any of the preceding embodiments, a control method of the persistent memory storage engine based on log structure includes:

S1000, allocating, by the persistent memory allocators, the new spaces to each of processors for storing the updated key value pairs;

S2000, organizing the acquired operation information into compact log entries, and adding the compact log entries into the persistent operation logs according to the first preset rule; and S3000, updating index entries in the volatile index structure to point to new key value pairs.

In a first embodiment of the present invention, an existing tree or hash index structure may be used directly as the volatile index structure, and each index entry points to an actual key value pair; the persistent operation log is used to persistently record execution contents of operations, and the execution order of the operations is described by the order of entries in the log; the persistent memory allocator is used to manage persistent memory spaces dedicated to respective processor cores and further store the actual key-value pairs.

In the first embodiment of the present invention, when updating an existing key value pair, in order to avoid the consistency problem caused by overwriting the original key value pair, the manner of "out-of-place" update is adopted, in which: the new space is allocated by the persistent memory allocator for storing the new version of the key-value pair; then the new key-value pair is written into the newly allocated space and subjected to the persistence operation; the log entry is initialized and is added to the persistent operation log; and finally, the persistent memory space used to store the old version of the key-value pair is reclaimed.

In a first embodiment of the present invention, in order to avoid redundant persistence operations introduced by maintaining the persistent memory allocator, the persistent memory allocator divides the persistent memory space into "memory regions" of the same size, and further formats each of the memory regions into different levels of memory blocks, where the memory blocks in the same memory region are of the same size; a prelude of each memory region is used to store bitmap metadata describing current allocation status; a header of the memory region is stored with persistent bitmap metadata, the bitmap metadata being capable of recording used and unused data blocks; the addresses of the memory regions are aligned by a fixed number of bytes, and an allocation granularity of a memory region is recorded in the header of the memory region. Since the free space condition of the memory region can be recovered by playing back the persistent operation log, the corresponding bitmap metadata does not need to be immediately persisted; when the persistent memory allocator performs the allocation operation, it only modifies the corresponding bitmap metadata, and does not need to persistently record the modified bitmap metadata immediately.

Figure 3:
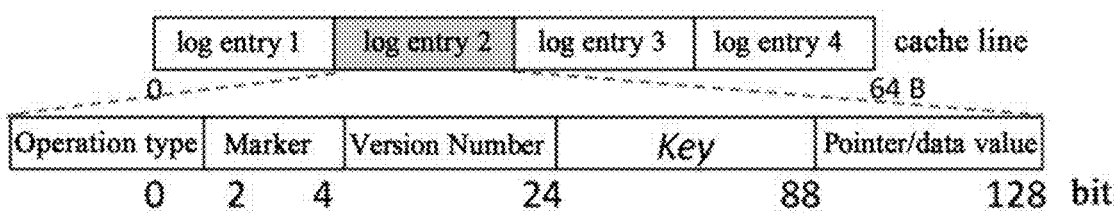
FIG. 3 is a schematic diagram of compact log entries in the present invention.

In the first embodiment of the present invention, since the cache line eviction instruction of the CPU only supports operation in the granularity of cache line, in order to be able to package more operations into one cache line for batch processing so as to reduce the number of persistent operations, a design of compact log entry is adopted; the compact log entry contains only index metadata and key-value pairs of very short length; and larger length key-value pairs are stored separately in the persistent memory allocator. FIG. 3 shows a structure of the compact log entry. As shown in FIG. 3, the compact log entry includes an operation type (insertion, deletion, etc.), a marker indicating whether a data value is in the log entry, a version number, a key, and a pointer pointing to an actual key-value pair (if the key-value pair is stored separately with the persistent memory allocator). The operation type is used to indicate an operation type corresponding to the entry. The marker indicating whether the data value is in the log entry is used to mark whether the data value is directly stored in the log entry and occupies the position of the key value pair pointer. The version number is used to ensure correctness when cleaning the old log entry. Key is used to store the keys of the key-value pair. Pointer pointing to the actual key-value pair is a pointer variable used to point to a storage location of the actual key-value pair. When the size of the key-value pair is less than one cache line, the marker indicating whether the data value is in the log entry is set, and the data value is directly stored at the end of the compact log entry, occupying the position of the pointer pointing to actual key-value pair. When the key-value pair size is large, the key-value pair is stored in the persistent memory allocator, and the position of the key-value pair is indicated by the pointer pointing to the actual key-value pair. Since the space allocation in the persistent memory allocator is performed with a minimal granularity of cache line and the cache line alignment is guaranteed for each allocated blocks, the pointer structure only records valid 40-bit information, and a valid pointer can be constructed by shift operation.

In a first embodiment of the present invention, the first preset rule is to perform batch persistence on compact log entries from multiple processor cores, which is called as pipeline batch persistence technology. The pipeline batch persistence technology is used to perform batch persistence on compact log entries from multiple processor cores; compared to traditional batch persistence technology, pipeline batch persistence technology can improve batch processing opportunity while ensuring low latency. FIG. 4 shows a sequence diagram of different batch persistence technologies. As shown in FIG. 4(a), persistent operation is required for each log entry if batch persistence technology is not adopted, which will cause a lot of time overhead and will occupy a lot of CPU time. FIG. 4(b) shows a general batch persistence technology, in which each processor core performs batch persistence on the log entries generated by the requests received by itself. This scheme can reduce the number of persistence operations to a certain extent; however, in order to obtain enough log entries for batch persistence, a lot of CPU time is still wasted in waiting. FIG. 4(c) shows the non-pipeline batch persistence technology, in which different cores can "steal" log entries from others for batch persistence, so that the processor core does not need to wait for enough log entries; but if a log entry of one processor core is "stolen" by other processors, this processor core must wait for other processor cores to complete the persistence operation before receiving subsequent requests, which still causes unnecessary waiting overhead.

Figure 6:
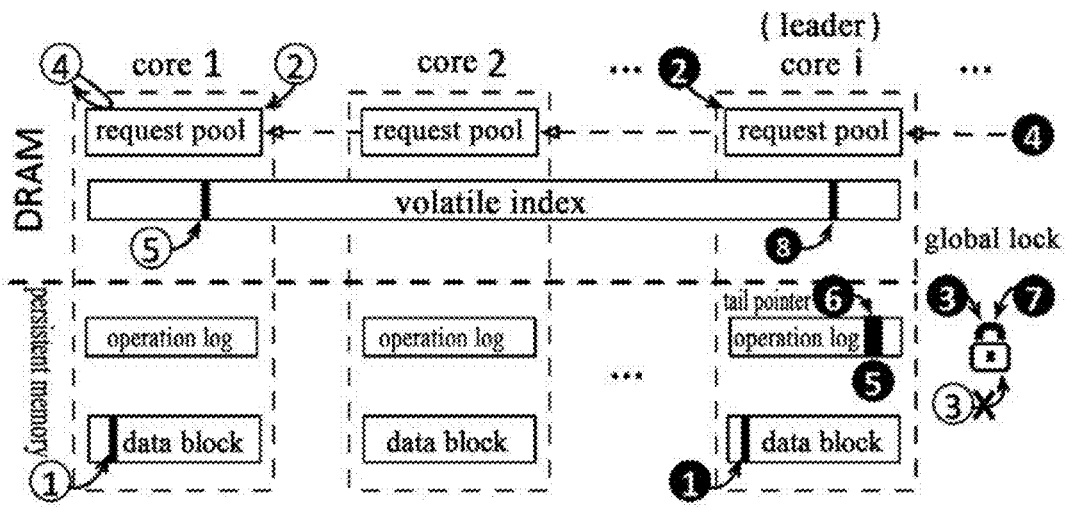
FIG. 6 is a schematic structural diagram of adding compact log entries to a persistent operation log in the present invention.

As a specific example, referring to FIGS. 5-6, in an embodiment, the method for organizing the acquired operation information into compact log entries and adding the compact log entries into the persistent operation logs according to the first preset rule includes:

S2100: initializing, by each of the processor cores, the compact log entries, and after completing initialization, racing, by all of the processor cores (cores 1, 2 . . . , i in FIG. 6), a global lock;

S2200: if one of the processor cores succeeds in racing (core i in FIG. 6), combining the compact log entries that have been initialized by other processor cores into a large log entry; and S2300: persistently recording the large log entry into a local operation log, releasing the global lock, and notifying other processor cores information about completion of persistency.

In this embodiment, as shown in FIG. 6, in order to synchronize respective processor cores, a global lock is introduced, and each processor core has its own request pool, shown as (2) in FIG. 6. When processing an insertion request, shown as (1) in FIG. 6, the persistent memory allocator allocates a corresponding space to store the key value. After initializing the log entries, the processor cores immediately race for the global lock, shown as (3) in FIG. 6; if one processor core succeeds in the race, the processor core becomes the leader, while other cores become the followers. The followers need to wait for the leader to complete the batch persistence operation; the leader collects log entries of other processor cores that have been initialized and wait for persistence, combines these initialized log entries and a local log entry into a large log entry, shown as (5) and (6) in FIG. 6, and then persistently records the entire large log entry into the local operation log in batch. Then the leader releases the global lock, shown as (7) in FIG. 6, notifies other processor cores about completion of the persistency, and finally modifies the index information in the memory, shown as (8) in FIG. 6, and returns the information to the client. FIG. 4 (d) shows the pipeline batch persistence technology. Simple non-pipeline batch persistence technology is only a sub-optimal strategy, because there is still large amount of CPU time is used to wait for the persistence operation to be completed. Compared to the simple non-pipeline batch persistence technology, after the log entry of a processor core is "stolen", the processor core does not have to wait for the persistence operation to be completed and can perform subsequent batch persistence work immediately, which significantly reduces waiting time of the processor core.

In a first embodiment of the present invention, the method for performing batch persistency on the compact log entries from multiple processor cores further includes: in order to further reduce CPU waiting time, when a processor core fails in racing for the global lock, acquiring a new client request, shown as (4) in FIG. 6, and performing a new round of batch persistence operation without being blocked in waiting for the information about completion of persistency; the follower only asynchronously waits for the information about completion sent from the previous leader. The processor core succeeding in the race quickly releases the global lock after copying the log entry, so the overhead of the persistence operation is moved outside the lock.

In the first embodiment of the present invention, in order to further reduce the end-to-end latency, after the log entries are persisted, the processor core at server-side can send the return information to the client, and the previously requested information about completion is carried in the current return information in an asynchronous manner.

In the first embodiment of the present invention, in order to prevent the case that a log entry of a previous insertion request is being persisted by another processor core when the same processor core is about to issue a query request, resulting in that the data of the previous insertion request is unavailable to the query request, each processor core maintains a conflict queue, and conflicting requests are postponed to ensure correctness.

In the first embodiment of the present invention, under the multi-core architecture, the only one global lock may cause significant synchronization overhead. To reduce the overhead in racing for the global lock without affecting the batch processing opportunity, all the cores on the same processor are grouped into a same group, and the pipeline batch persistence process is executed separately in each group; reasonable group size can balance the synchronization overhead and the scale of batch persistence; small group can reduce synchronization overhead, but the scale of batch persistence reduces; it is appropriate to put the cores on the same socket into the same group. Further, the indexing in the memory and the allocation of data blocks in the persistent memory are all in a way based on the principle of proximity, in which allocation is done within the NUMA node as much as possible to further reduce remote memory access.

In a first embodiment of the present invention, each processor core periodically cleans up old history log entries in the persistent operation log while the persistent memory key value storage engine continues to operate; each processor core maintains the proportion of old log entries in each of the memory regions in the memory, and determines whether to reclaim a memory region by checking the proportion of old log entries in this memory region; the cleaning work is completed by the background thread. The cores belonging to the same group share a background thread, and the cleaning work of the groups of processor cores can be parallel; when cleaning the log entries, the version information in each log entry is checked to determine whether the log entry is valid. Valid log entries in the memory region being cleaned are copied to the newly allocated memory region.

In a first embodiment of the present invention, in the case of a normal shutdown, the engine copies the volatile index structure into persistent memory and persistently records bitmap metadata for each of the memory regions. After a restart, the volatile index can be imported from the persistent memory. In the case of a system failure, the volatile index is reconstructed by scanning the log entries.

Figure 7:
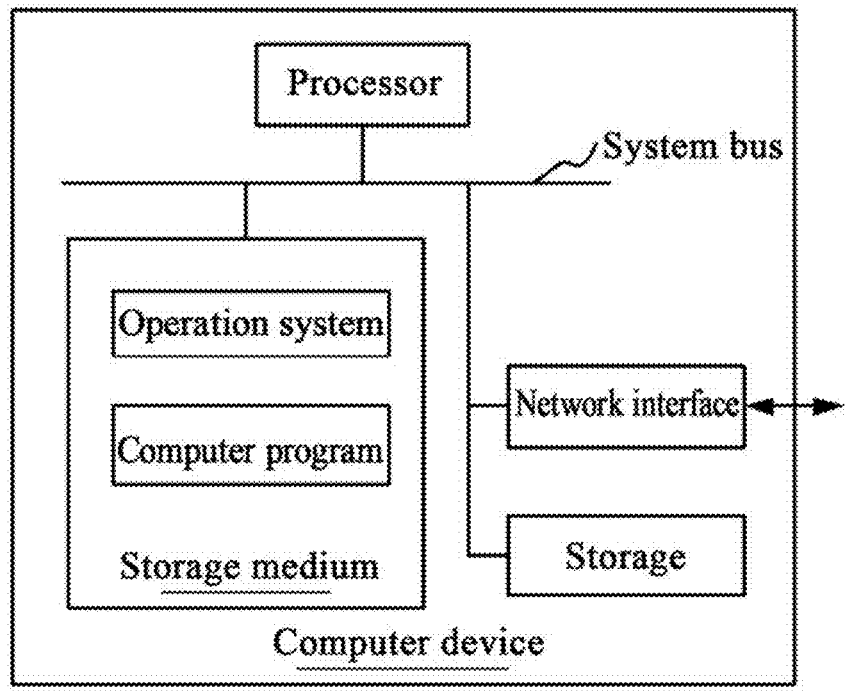
FIG. 7 is a block diagram showing the basic structure of a computer device of the present invention.

Reference is made to FIG. 7 for a block diagram of a basic structure of a computer device provided in an embodiment of the present invention.

The computer device includes a processor, a non-volatile storage medium, a storage, and a network interface connected by a system bus. The non-volatile storage medium of the computer device stores an operating system, a database, and computer readable instructions. The database may store a sequence of control information. When the computer readable instructions are executed by the processor, the processor is enabled to implement a control method of a persistent memory storage engine based on log structure. The processor of the computer device is used to provide computing and control capabilities to support the operation of the entire computer device. The computer device can store, in the storage of the computer device, computer readable instructions that, when executed by the processor, cause the processor to implement a control method of a persistent memory storage engine based on log structure. The network interface of the computer device is used to be connected to and communicate with a terminal. It will be understood by those skilled in the art that the structure shown in FIG. 7 is only a block diagram of a part of the structure related to the solution of the present application, and does not constitute a limitation to the computer device to which the solution of the present application is applied. The specific computer device may include more or fewer elements than those shown in the drawing, or some elements are combined, or different arrangement of the elements is included.

The present invention also provides a storage medium for storing computer readable instructions which, when executed by one or more processors, causes the one or more processors to perform the control method of the persistent memory storage engine based on log structure according to any of the above embodiments.

A person of ordinary skills in the art can understand that all or part of the processes in implementing the above methods in the embodiments can be completed with related hardware by following instructions of a computer program which may be stored in a computer-readable storage medium. When executed, the program may implement the processes of the methods of the above embodiments. The storage medium may be a non-volatile storage medium such as a magnetic disk, an optical disk, a read-only memory (ROM), or a random access memory (RAM).

It should be understood that although various steps in the flowchart of the drawings are sequentially displayed as indicated by the arrows, these steps are not necessarily performed in the order indicated by the arrows. Unless explicitly stated herein, the execution of these steps is not strictly limited in order, and may be performed in other order. Moreover, at least some of the steps in the flowchart of the drawings may include multiple sub-steps or stages, which are not necessarily performed at the same time, but may be executed at different time, and the execution thereof is not necessarily performed sequentially, but may be performed with other steps or at least a portion of sub-steps or stages of other steps in turn or in an alternate way.

Only some of the embodiments of the present invention are described above, and it should be noted that those skilled in the art can make several improvements and modifications without departing from the principles of the present invention. These improvements and modifications should be considered as falling in the scope of the present invention.

Although embodiments of the present invention have been shown and described above, it is understood that the foregoing embodiments are illustrative and should not be understood as limiting the present invention. Variations, modifications, alterations and changes of the above-described embodiments are possible to those skilled in the art without departing from the principle and purpose of the present invention.

What is claimed is:

1. A persistent memory storage engine device based on log structure, comprising:
    persistent memory allocators: configured for managing persistent memory spaces of respective processor cores, and further allocating new spaces to each of the processors for storing updated key-value pairs;
    persistent operation logs: configured for organizing acquired operation information into compact log entries to be added into storage according to a first preset rule, wherein the first preset rule is to perform batch persistency on the compact log entries from a plurality of processor cores; wherein there are a plurality of persistent operation logs and persistent memory allocators, with each of the processor cores being provided with the persistent operation log and the persistent memory allocator; and
    a volatile index structure: configured for updating index entries to point to new key-value pairs,
    wherein in the batch persistency on the compact log entries:
        racing, by all of the processor cores, a global lock; and
        once one of the processor cores succeeds in racing, each of other processor cores which are failed in racing for the global lock, acquiring a new client request and performing a new round of batch persistence operation without waiting for a completion of the batch persistency.

2. The persistent memory storage engine device based on log structure according to claim 1, wherein the global lock is to synchronize the plurality of processor cores to concurrently add the persistent operation logs.

3. The persistent memory storage engine device based on log structure according to claim 1, wherein in the process of performing batch persistency on the compact log entries from the plurality of processor cores, all cores on a same processor are grouped together to reduce overhead in racing for a global lock without affecting batch processing opportunity.

4. The persistent memory storage engine device based on log structure according to claim 1, wherein the persistent memory allocator divides the persistent memory space into memory regions of a same size and formats the memory regions into memory blocks of different levels; the memory blocks in a same memory region are of a same size; and a prelude of each memory region is used to store bitmap metadata describing current allocation status.

5. A control method of a persistent memory storage engine based on log structure, wherein the control method comprises:
    allocating, by a persistent memory allocators, new spaces to each of processors for storing updated key value pairs;
    organizing acquired operation information into compact log entries, and adding the compact log entries into persistent operation logs according to a first preset rule, wherein the first preset rule is to perform batch persistency on the compact log entries from a plurality of processor cores; and
    updating index entries in a volatile index structure to point to new key value pairs,
    wherein in the batch persistency on the compact log entries:
        racing, by all of the processor cores, a global lock; and
        once one of the processor cores succeeds in racing, each of other processor cores which are failed in racing for the global lock, acquiring a new client request and performing a new round of batch persistence operation without waiting for a completion of the batch persistency.

6. The control method of the persistent memory storage engine based on log structure according to claim 5, wherein organizing the acquired operation information into compact log entries and adding the compact log entries into the persistent operation logs according to the first preset rule comprises:
    initializing, by each of the processor cores, the compact log entries, and after completing initialization, racing, by all of the processor cores, the global lock;
    if one of the processor cores succeeds in racing, combining the compact log entries that have been initialized by other processor cores into a large log entry; and
    persistently recording the large log entry into a local operation log, releasing the global lock, and notifying other processor cores information about completion of persistency.

7. The control method of the persistent memory storage engine based on log structure according to claim 5, wherein allocating, by the persistent memory allocators, the new spaces to each of processors for storing the updated key value pairs comprises:

after the persistent memory allocators allocate the new spaces, writing the new key-value pairs to the new spaces, and reclaiming the persistent memory spaces for storing old version of the key-value pairs.

8. The control method of the persistent memory storage engine based on log structure according to claim 5, wherein when a size of the key value pair is smaller than one cache line, the key value pair is directly stored in an end of the compact log entry.

9. The control method of the persistent memory storage engine based on log structure according to claim 5, further comprising:

in a case of normal shutdown, copying, by the storage engine based on log structure, the volatile index structure into a persistent memory and persistently recording bitmap metadata in each of the memory regions;

after a reboot, importing the volatile index from the persistent memory; and in a case of system failure, reconstructing the volatile index by scanning the log entries.

10. The persistent memory storage engine device based on log structure according to claim 1, wherein:

some key-value pairs are stored in the compact log entries while some key-value pairs are stored in the persistent memory allocators, and each of the compact log entries comprises an operation type, a marker indicating whether a data value is in log entry, a version number, a key, and a pointer pointing to an actual key-value pair.

\* \* \* \* \*